United States Patent
Venkitakrishnan et al.

(10) Patent No.: US 6,918,012 B2
(45) Date of Patent: Jul. 12, 2005

(54) STREAMLINED CACHE COHERENCY PROTOCOL SYSTEM AND METHOD FOR A MULTIPLE PROCESSOR SINGLE CHIP DEVICE

(75) Inventors: Padmanabha I. Venkitakrishnan, Sunnyvale, CA (US); Shankar Venkataraman, Danville, CA (US); Stuart C. Siu, Castro Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 09/942,328

(22) Filed: Aug. 28, 2001

(65) Prior Publication Data

US 2003/0046495 A1 Mar. 6, 2003

(51) Int. Cl.[7] .............................................. G06F 12/14
(52) U.S. Cl. ........................ 711/145; 711/144; 711/119
(58) Field of Search ................................ 711/145, 144, 711/141, 119, 154, 143, 158, 146, 156, 121; 710/200, 220, 240, 244

(56) References Cited

U.S. PATENT DOCUMENTS

| | | | | |
|---|---|---|---|---|
| 5,297,269 A | * | 3/1994 | Donaldson et al. ......... 711/145 |
| 5,623,632 A | * | 4/1997 | Liu et al. .................... 711/144 |
| 5,680,576 A | * | 10/1997 | Laudon ...................... 711/145 |
| 6,115,804 A | * | 9/2000 | Carpenter et al. ............ 712/28 |
| 6,260,117 B1 | * | 7/2001 | Freerksen et al. .......... 711/146 |
| 6,356,983 B1 | * | 3/2002 | Parks ........................ 711/145 |
| 6,418,514 B1 | * | 7/2002 | Arimilli et al. ............. 711/133 |
| 2002/0129211 A1 | * | 9/2002 | Arimilli et al. ............. 711/146 |
| 2002/0184445 A1 | * | 12/2002 | Cherabuddi ................. 711/130 |

* cited by examiner

Primary Examiner—Hong Kim

(57) ABSTRACT

A streamlined cache coherency protocol system and method for a multiple processor single chip device. There are three primary memory unit (e.g., a cache line) states (modified, shared, and invalid) and three intermediate memory unit pending states. The pending states are used by the present invention to prevent race conditions that may develop during the completion of a transaction. The pending states "lock out" the memory unit (e.g., prevent access by other agents to a cache line) whose state is in transition between two primary states, thus ensuring coherency protocol correctness. Transitions between states are governed by a series of request and reply or acknowledgment messages. The memory unit is placed in a pending state while appropriate measures are taken to ensure access takes place at an appropriate time. For example, a modification occurs only when other agents can not access the particular memory unit (e.g., a cache line).

16 Claims, 4 Drawing Sheets

STREAMLINED CACHE COHERENCY PROTOCOL SYSTEM AND METHOD FOR A MULTIPLE PROCESSOR SINGLE CHIP DEVICE

FIELD OF THE INVENTION

The present invention relates generally to single electronic integrated circuit (IC) chip system architectures. More particularly, the present invention relates to a method and system for efficiently establishing cache coherency over a high performance system bus architecture included in a multiple processor integrated circuit device.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Frequently, advanced computer applications are needed to realize these advantageous results and these advanced applications require increasingly powerful computer devices. The demand for ever greater functionality and convenience has resulted in a need for increased performance in smaller packages. One approach to providing sufficient processing power is to utilize multiple processors. However, utilizing multiple processors often gives rise to number of problems such as inefficient memory coherency management.

Numerous electronic devices include processors that operate by executing programs comprising a series of instructions. These programs and their series of instructions, are collectively referred to as software. Software instructions include directions that guide the processor device functions and cause it to perform useful tasks. The utility a processor device provides often depends upon the speed and efficiency at which instructions included in a software program are executed.

One conventional attempt at increasing computer performance involves the implementation of multiprocessor systems. Each processor in a conventional multiprocessor system is located in a separate chip with separate memory controllers and I/O controllers. These chips are connected together by a conventional interconnect (bus, crossbar switch, or similar method) on a printed circuit board (PCB). A conventional multiprocessor system typically comprises two or more processor chips connected to one or more memory controller chips, one or more I/O control chips, and a conventional bus. The separate components are provided as separate integrated circuit dies, or chips, and mounted on and interconnected to a motherboard or PCB, for example, using standard pins and sockets, flip-chip mounting, wire-bond connections, etc. Conventional multiprocessor systems overcome many of the performance limitations of the single processor systems. For example, instead of exclusively relying on clock speed increases or increasing levels of integration, performance can be increased by dividing software based applications into two or more execution threads and executing them in parallel. However, conventional multiprocessor systems have their limitations.

One problem with conventional multiprocessor systems is the cost of chip pins and the physical limitations of PCB wires limit the datapath width and clock frequency of the interconnect. These limitations decrease the system performance by increasing the memory latency for each processor and the synchronization latency between processors (e.g., in multiprocessor applications). Much of the complexity of the current generation of processors is a result of techniques for mitigating the effects of this increased latency on performance.

The implementation of multiprocessor systems within a single die, referred to in the industry as Chip Multi-Processor (CMP), solves some of the conventional multiprocessor system problems, but others remain. For example, CMP systems reduce the costs of chip pins, the physical limitations of PCB wires and interconnect clock frequencies are reduced. However, problems with respect to coordination among the multiple processors, efficient load sharing of the software application load, and efficient access to memory remain. Increasing the numbers of processors in prior art CMP systems does not linearly increase the performance of the systems due to the problems inherent in managing multiple processors to solve common problems, specifically problematic are the memory management overhead problems. Managing coherency between different cache memories is critical, if a processor is not utilizing coherent information the results are typically inconsistent and flawed.

Thus, what is required is a solution that provides the advantages of CMP systems with respect to increasing computer system performance while facilitating efficient and coherent cache memory management. The present invention provides a novel solution to the above problems.

SUMMARY OF THE INVENTION

The present invention is a streamlined efficient cache coherency protocol system and method for a multiple processor one chip (MPOC) system. In one embodiment the present invention is a cache coherency maintenance system embedded on a single substrate that includes a plurality of cache memories, a plurality of processor cores and a coherency maintenance system bus. The cache memories include a memory unit (e.g., a cache line) for storing information that is utilized by the processor cores. At least one of the processor cores is coupled to and associated with one of the cache memories. The system bus communicates the information between the cache memories and the processor cores in accordance with a coherency protocol. The coherency protocol utilizes a pending state to prevent access to a cache line that is in transition between primary states such as a modified state, shared state and an invalid state. In the modified state the cache line includes a recent value, in the shared state the cache line includes the same value as in another memory, and in an invalid state the cache line is not available for access in the particular cache in which it is in the invalid state. The pending state ensures coherency and prevents race conditions from developing during the completion of a transaction. Transitions between states are governed by a series of request and reply or acknowledgment messages and a memory unit (e.g., cache line) is placed in a pending state while appropriate measures are taken to ensure memory access transactions take place at an appropriate time.

BRIEF DESCRIPTION OF THE DRAWINGS

The present invention is illustrated by way of example and not by way of limitation, in the Figures of the accompanying drawings and in which like reference numerals refer to similar elements and in which.

DETAILED DESCRIPTION OF THE INVENTION

Figure 1A:
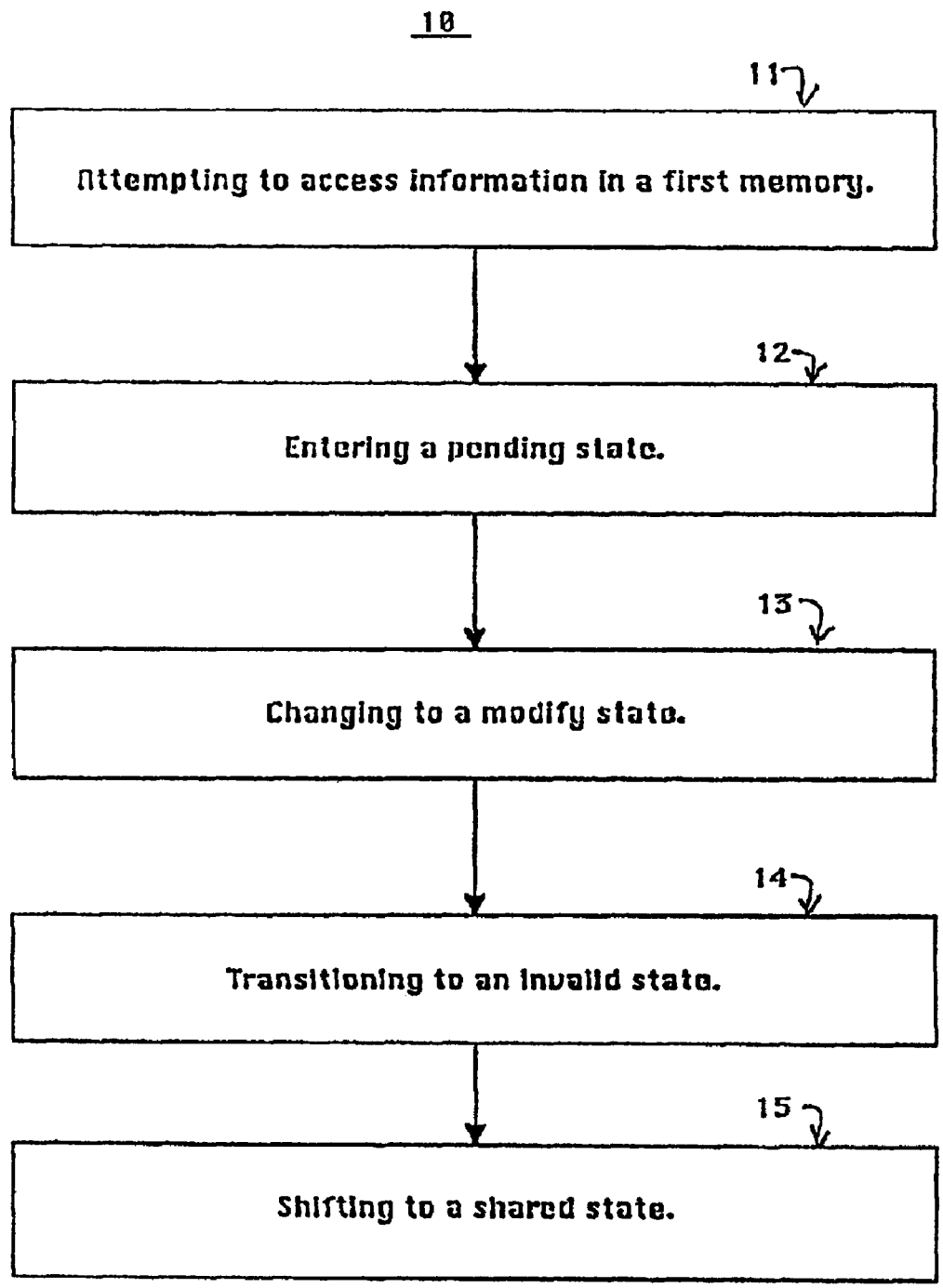
FIG. 1A is a flow chart of a multiple processor coherency maintenance method, one embodiment of the present invention.

Reference will now be made in detail to the embodiments of the invention, a streamlined cache coherency protocol system and method for a multiple processor single chip device, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

The present invention is a streamlined cache coherency protocol system and method for multiple processors one chip (MPOC) integrated circuit device (e.g., on a single substrate). The streamlined cache coherency protocol system and method facilitates efficient and coherent cache memory management in a manner that avoids many of the prior art problems. The system and method is adaptable to architectures that take advantage of CMP systems with respect to increasing computer system performance while enabling cache coherency for multiple processors included in a shared memory architecture. In one exemplary implementation, coherency (or data consistency) guarantees that a system with a plurality of active agents and memories (e.g., caches, embedded memories, off chip memories, etc.) presents a shared memory model in which agents do not read stale data and actions can be serialized as needed. A present invention streamlined cache coherency protocol system and method also provides an efficient low latency, high throughput interconnection over a system bus with efficient management of dedicated processor cache memory.

Embodiments of the present invention are directed towards a memory coherency system and method utilized in a single chip multiprocessor integrated circuit device. The present invention provides the advantages of CMP systems with respect to increasing performance (e.g., of a computer system) while minimizing many of the traditional handicaps such as memory management overhead problems. The present invention facilitates coherency maintenance in an efficient "system" bus interconnection mechanism for MPOC type CMP systems, including systems with embedded memory. In one embodiment, a streamlined cache coherency protocol system and method of the present invention directs performance of the memory coherency functions, in which maintaining coherency includes coherency between caches included in each processor of the multi-processor chip, the input/output functions of the multiprocessor chip, and each off chip memory. In one exemplary implementation, the present invention is included in a low latency, high throughput operation MPOC system and provides efficient management of dedicated processor cache memory and embedded dynamic random access memory (eDRAM). The present invention and its benefits are further described below.

FIG. 1A is a flow chart of memory coherency maintenance method 10, one embodiment of the present invention. Memory coherency maintenance method 10 maintains information coherency between different memories in a MPOC system. The present invention method ensures that a MPOC system with a plurality of memories and active agents presents coherent information throughout a shared memory architecture in which agents do not read stale data and actions are serialized as needed. In one embodiment of the present invention, memory coherency maintenance method 10 provides coherency support for a variety of features of a system including the caches of each processor, embedded memory, chip input/output functions associated with off chip memories, etc.

In Step 11, an attempt to access information in a first memory (e.g., a cache memory) is made. In one exemplary implementation of the present invention, processors attempt to read and write information to the first memory. In one embodiment of the present invention, the attempted access is made by a processor associated with the first memory (e.g., a processor accessing the memory as an internal cache). The present invention is also readily adaptable to access attempts by a processor not associated with the first memory (e.g., a processor accessing the memory as an external cache).

In Step 12, a pending state is entered. The pending state locks out access to information included in the first memory (e.g., a cache line) while transitioning between other states associated with a memory transaction. The lock out enables memory coherency maintenance method 10 to ensure coherency is maintained in the system. During the pending state the system waits for indications that the information is in an appropriate state for actions in the first memory to proceed. In one embodiment of the present invention, the system waits for indications that the information in other memories is an appropriate state for actions to proceed.

In Step 13, a change to a modify state is made. In the modified (M) state the information in the first memory (e.g., an internal cache memory) comprises a value more recent (e.g., updated information) than information in another memory (e.g., an external cache memory or other embedded memory). Internally reading or writing the information causes no activity on a system bus.

In Step 14 a transition is made to an invalid state. In an invalid state information is not available from the first memory. An internal access to the invalid information misses. In one exemplary implementation of the present invention, the information is fetched over a system bus from another location (e.g., another memory). In one embodiment of the present invention, when a modified state is entered in step 13 in the first memory the information is put into an invalid state in other memories.

In Step 15, a shift to a shared state is implemented. In a shared state the first memory (e.g., a cache) includes the same information value as in another memory (e.g., another cache). In one exemplary implementation of the present invention, a memory in a shared state includes the same information value as in another memory. Internally reading the information causes no system bus activity in one embodiment of the present invention and internally writing the information causes the information to enter a pending state before an invalid state.

Figure 1B:
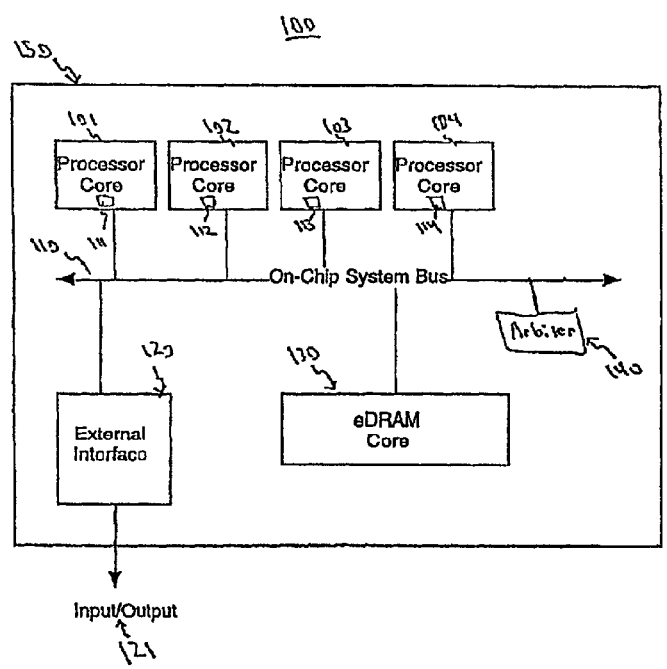
FIG. 1B shows a diagram of a CMP system in accordance with one embodiment of the present invention.

FIG. 1B shows a diagram of a cache coherent many processor one chip (MPOC) system 100. Cache coherent many processor one chip (MPOC) system 100 is one embodiment of a present invention cache coherency maintenance system. As depicted in FIG. 1, CMP system 100 includes processor units 101–104 coupled to a system bus 110. Each of the processors 101–104 has its own clock, associated cache memory (e.g., caches 111–114 respectively) and program counter. An external interface unit 120, an embedded RAM unit 130, and an arbiter unit 140 are also coupled to system bus 110. The components 101–140 are fabricated into a single integrated circuit die 150 on a single substrate. In this embodiment, RAM unit 130 is implemented as an embedded DRAM core, processor units 101–104 are implemented as high speed RISC processor cores, preferably MIPS compatible processor cores.

Referring still to system 100 of FIG. 1, the system bus 110 provides coherency maintenance for processor 101 through 104 caches. In one embodiment of the present invention, on-chip system bus 110 also provides coherency maintenance for external interface 120 and off chip memory (not shown). In one exemplary implementation of the present invention on-chip system bus 110 is a high bandwidth and low latency Symmetric Multi-Processing (SMP) type bus for communicating information between a plurality of on-chip microprocessor cores (e.g., microprocessor cores 101–104) and an embedded DRAM (eDRAM) core (e.g., eDRAM 130). In one exemplary implementation of the present invention, cache coherency MPOC system 100 includes a single-chip community of identical high speed RISC processors surrounding a large common storage area (e.g., eDRAM 130). Each of processors 101–104 is a relatively small and simple processor capable of running very fast with low power consumption.

Embodiments of the system 100 can be targeted for mid to high end embedded applications and e-commerce markets, where CMP system 100 attributes have several qualities that make them attractive. System 100's instruction set architecture supports smaller rather than larger program sizes (e.g., more towards the small RISC style of instruction set and less towards the wide VLIW style). In one embodiment, to speed development and increase customer acceptance, the instruction set is fully compatible with an established standard, MIPS.

Cache coherency protocols, messages, and transactions are now described for one embodiment of the present invention. The coherency system and method of the present invention supports multiple caching agents (processor cores) executing concurrently. The cache protocol facilitates coherency with simplicity and performance. In one exemplary implementation, coherency (or data consistency) guarantees that a system with caches and memory and multiple levels of active agents presents a shared memory model in which agents do not read stale data and actions can be serialized as needed. For example, data coherency between a plurality of memories is maintained during cache line transactions (e.g., a cache line write process, cache line read process, etc.)

In one embodiment of the present invention, a cache is configured in cache lines which are units of information storage. In one exemplary embodiment of system 100, a cache line is 32 bytes of data or instructions aligned on a 32-byte boundary in the physical address space. A cache line can be identified with the address bits (e.g., OcsbAddr [35:0]). The cache coherency protocol associates states with a cache line and defines rules governing state transitions. In one exemplary implementation of the present invention, states and state transitions depend on a variety of system processor core generated activities and activities by other bus agents (including other processor cores, on-chip eDRAM, input/output functions, etc.).

In the present invention cache coherency protocol architecture, each cache line has a state. There are three primary cache line states, Modified (M), Shared (S), and Invalid (I). An attempted access or transaction (e.g., read or write) to a line in a cache can have different consequences depending on whether it is an internal access by the processor core, or an external access by another processor core on the system bus (e.g., system bus 110) or another memory (e.g., eDRAM 130). A cache line in an invalid state is not available for access in the particular cache in which it is in the invalid state. An internal access to a line misses the cache and will cause the processor core to fetch the line information from the system bus (e.g., fetch information from eDRAM 130 or from another cache in another processor core via system bus 110). In a shared cache line state the line comprises the same value as in memory, and can have a shared state in other caches. Internally reading a shared state cache line causes no system bus activity. Attempting to internally write the cache line causes a cache line in other caches to enter an invalidate state line before the internal write is permitted to proceed. In the modified (M) cache line state the line includes a more recent value than memory, and is invalid in other caches. Internally reading or writing the modified state cache line causes no system bus activity.

A present invention coherency system and method also includes intermediate cache line pending states in addition to the three primary states described above. The pending states are used by the coherency present invention to prevent race conditions that may develop during the completion of coherency bus transactions. The pending states, in effect, lock out a cache line whose state is in transition between two primary states, thus ensuring coherency protocol correctness.

In one embodiment of the present invention, the intermediate pending states include a pending invalidate write miss (P_I_WM) state, pending copy back (P_CB) state, and pending copy forward (P_CF) state. In the P_I_WM state the line is in a pending state and is waiting to collect Invalidate Acknowledgments from other agents (e.g., caching agents) on the system bus (e.g., system bus 110). A line enters the P_I_WM state in the case of an internal or external write miss. Once all Invalidate Acknowledgments (IACKs) are received, this state transitions over to the Modified state so that an access (e.g., a write transaction process) can proceed. In the P_CB state the line is in a pending state that is waiting for a Copy Back Reply message. A line enters the P_CB state in the case of a writeback (copy back) due to an external write miss. Once the Copy Back Reply message is received, the P_CB state transitions over to an Invalid state, indicating the absence of an internal copy of the cache line. In the P_CF state the line is in a pending state that is waiting for a Copy Forward Reply message. A line enters this state in the case of a cache to cache transfer (e.g., copy forward) due to an external read miss. Once the Copy Forward Reply message is received, the P_CF state transitions over to the Shared state, indicating a read-only internal copy of the line is available.

Figure 2:
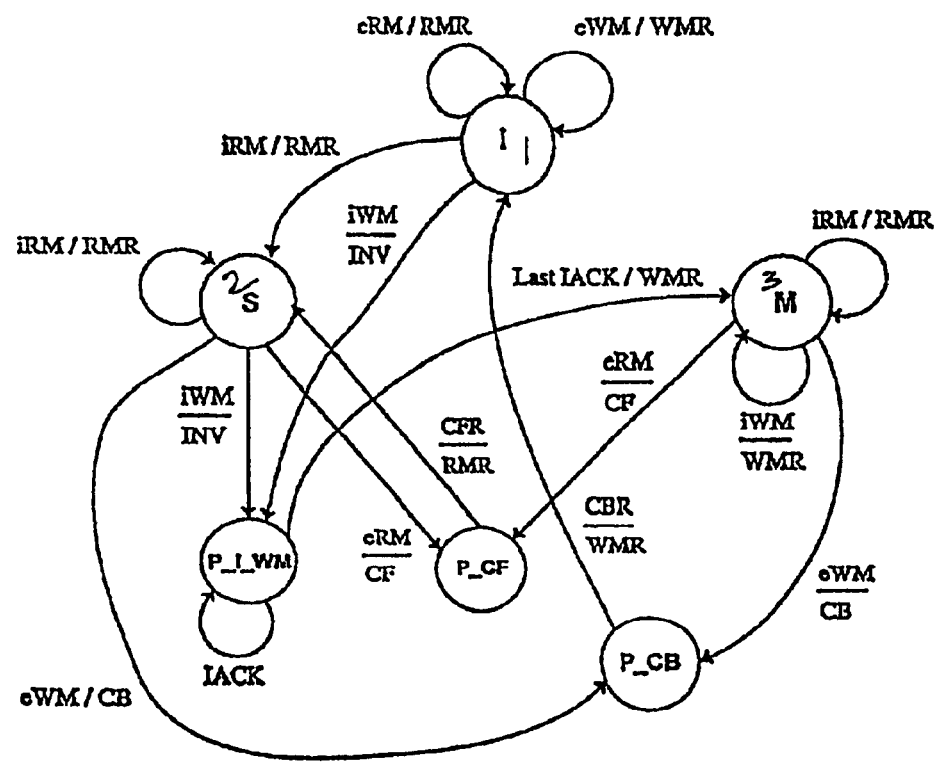
FIG. 2 shows a state transition diagram depicting the transitions between the states in accordance with the cache coherency protocols.

FIG. 2 shows one implementation of a state transition diagram depicting the transitions between the states in accordance with present invention cache coherency protocols. FIG. 2 illustrates the coherency protocol state transitions between primary and pending states for internal and external requests with appropriate replies. With respect to coherency protocol messages depicted in FIG. 2, the present invention utilizes messages while transitioning between the shown cache line states.

In one embodiment of the present invention the messages include read miss messages, write miss messages, status messages and copy messages. The read miss messages include an internal Read Miss (iRM) message request due to an internal read miss, an external Read Miss (eRM) message request due to an external read miss, and a Read Miss Reply (RMR) message generated in response to a read miss request (internal or external). The write miss messages include an internal Write Miss (iWM) message request due to an internal write miss, an external Write Miss (eWM) message request due to an external write miss, and a Write Miss Reply (WMR) message generated in response to a write miss request (internal or external). The status messages include an Invalidate (INV) message request to invalidate a cache line, and an Invalidate Acknowledge (IACK) message indicating acknowledgment of a completed invalidation. The copy messages include a Copy Back (CB) message request for a copy back (e.g., writeback to memory), a Copy Back Reply (CBR) message indicating completion of copy back, a Copy Forward (CF) message requesting a copy forward (e.g., a cache to cache transfer), and a Copy Forward Reply (CFR) message indicating completion of copy forward.

With respect to coherency memory types each cache line has a memory type determined by the processor core associated with the cache. For caching purposes, the memory type can be writeback (WB), write-through (WT), write-protected (WP), or un-cacheable (UC). A WB cache line is cacheable and in one embodiment of the present invention is fetched into the cache on a write miss. A write to a WB cache line does not cause bus activity if the line is in the modify (M) state. A WT cache line is cacheable but is not fetched into the cache on a write miss. A write to a WT cache line goes out on the system bus. A WP cache line is also cacheable, but a write to it cannot modify the cache line and the write goes out on the system bus. A WP cache line is not fetched into the cache on a write miss. A UC cache line is not put into the cache.

With respect to coherency bus transactions, in one embodiment of a cache coherent many processor one chip (MPOC) system coherency transactions are classified into generic groups. In one embodiment the generic groups include, a read line transaction, a read part line transaction, a write line transaction, a write part line transaction, a read invalid line transaction, a invalid line transaction, and an implicit write back transaction. A system bus read line transaction is a memory read transaction for a full cache line and indicates that a requesting agent has had a read miss. A system bus read part line transaction indicates that a requesting agent issued a memory read transaction for less than a full cache line. A system bus write line transaction indicates that a requesting agent issued a memory write transaction for a full cache line and indicates that a requesting agent intends to write back a Modified line. A system bus write part line transaction indicates that a requesting agent issued a memory write transaction for less than a full came line. A system bus read invalidate line transaction indicates that a requesting agent issued a memory (Read) invalidate line transaction for a full cache line. For example, the requesting agent has had read miss and intends to modify this line when the line is returned. A system bus invalidate line transaction indicates that a requesting agent issued a memory (Read) invalidate transaction for 0 bytes. The requesting agent includes the line in a shared (S) state and intends to modify the line. In case of a race condition, the reply for this transaction can comprise an implicit writeback. A system bus implicit write back is not an independent bus transaction, it is a reply to another transaction that requests the most up-to-date data. When an external request hits a modified line in the local cache or buffer, an implicit write back is performed to provide the modified line and at the same time, update memory.

Figure 3:
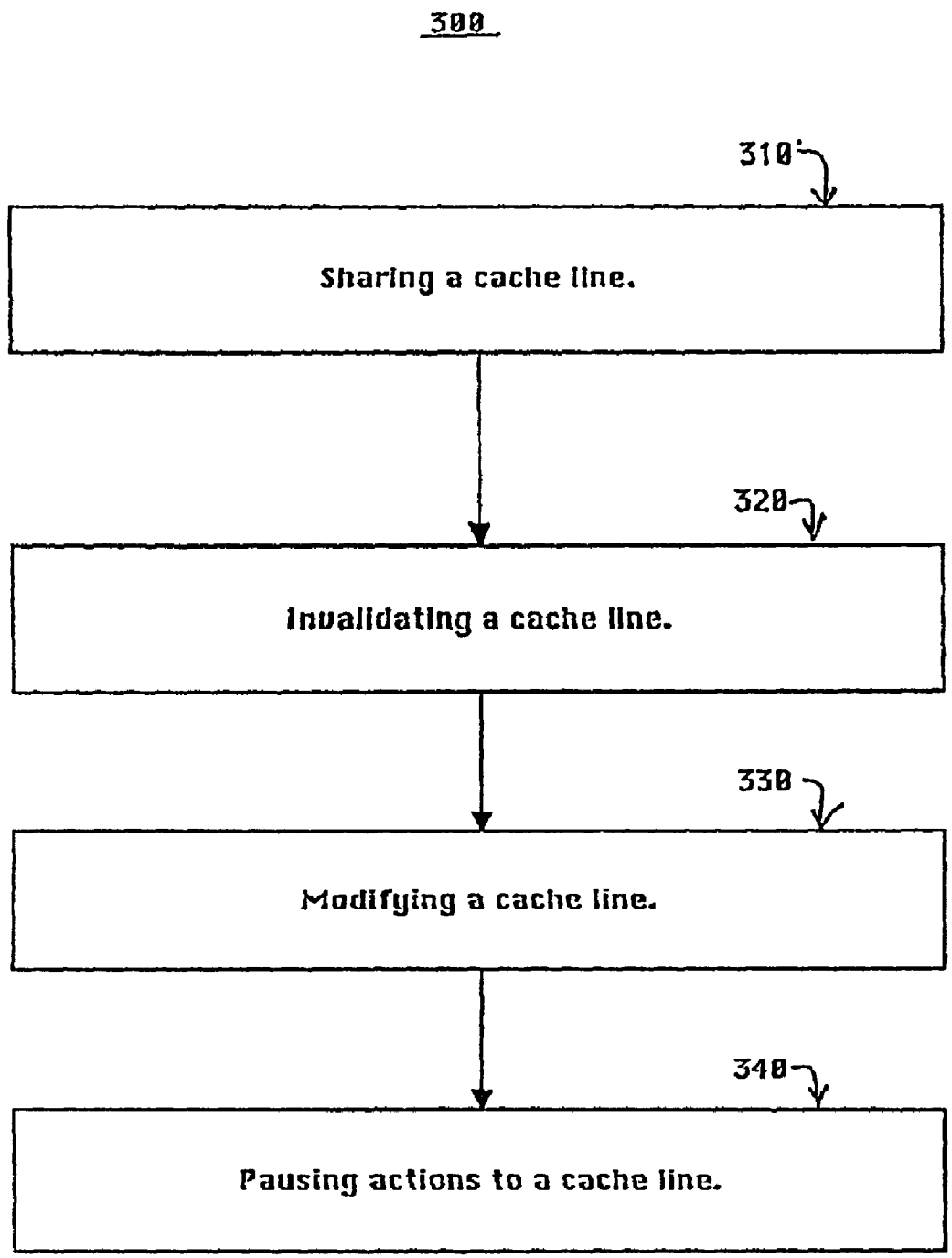
FIG. 3 is a flow chart of one embodiment of a present invention cache coherent many processor one chip (MPOC) method.

FIG. 3 is a flow chart of cache coherent many processor one chip (MPOC) method 300, one embodiment of the present invention. Cache coherent many processor one chip (MPOC) method 300 provides coherency between a plurality of caches associated with multiple processors. In one embodiment of the present invention, cache coherent MPOC method 300 also provides coherency for an external interface and external memory. Cache coherent MPOC method 300 facilitates avoidance of many of the traditional handicaps such as memory management overhead problems associated with CMP systems while still allowing increased system performance. In one embodiment, cache coherent MPOC method 300 performs all the memory coherency functions, including between caches included in each processor of the multi-processor chip, the input/output functions the multiprocessor chip deals with, and each off chip memory. In one exemplary implementation, cache coherent MPOC method 300 operates a low latency, high throughput operation CMP system and provides efficient management of dedicated processor cache memory and embedded dynamic random access memory (DRAM).

In step 310 a cache line is shared. In one embodiment of the present invention a cache line is shared in a plurality of caches. In one exemplary implementation of the present invention, a shared cache line comprises the same value as in a main memory (e.g., eDRAM 130). In one embodiment of the present invention, sharing a cache line includes a sharing control process. The sharing control process includes permitting internal reading of the cache line without shared system bus activity, and producing a invalid line transaction when the cache line is internally written.

In step 320 a cache line is invalidated. In one embodiment of the present invention, an invalidated cache line produces an internal access line miss and causes a processor core to fetch the line from an on chip system bus (OCSB). In one exemplary implementation the processor core utilizes the OCSB (e.g., system bus 110) to fetch information from a main memory (e.g., eDRAM 130 ) or from another cache associated with in another processor core.

In step 330 a cache line is modified. In one embodiment of the present invention, a modified cache line includes a more recent value than a main memory and is invalid in other caches. In one exemplary implementation of the present invention, modified cache lines are permitted to be read without OCSB activity.

In step 340 actions to a cache line are paused. In one embodiment of the present invention, a pause is implemented before a cache line is shared, invalidated or modified. In one exemplary implementation of the present invention a cache line enters a pending state.

Thus, the present invention facilitates coherency management and maintenance. The streamlined cache coherency protocol for a multi processor chip device enables a system to avoids many of the traditional coherency problems associated with memory management overhead while still permitting utilization of CMP system advantages with respect to increasing computer system performance. The present invention provides an efficient interconnection and coherency mechanism for CMP systems, including those with embedded memory and those that interact with off chip memories. The system and method is adaptable to architectures that take advantage of CMP systems with respect to increasing computer system performance while enabling cache coherency for multiple processors. In one exemplary implementation, coherency (or data consistency) guarantees that a system with a plurality of active agents and memories (e.g., caches, embedded memories, off chip memories, etc.) presents a shared memory model. The shared memory model enables appropriate information access sequencing and decreases the likelihood of operations inappropriately using stale data. A present invention streamlined cache coherency protocol system and method also provides an efficient low latency, high throughput interconnection over a system bus with efficient management of dedicated processor cache memory.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A cache coherency maintenance system, comprising:
   a plurality of cache memories including a cache line for storing information;
   a plurality of processor cores included on a single substrate for processing instructions and information stored in said plurality of cache memories wherein one of said plurality of processor cores is coupled to and associated with one of said plurality of cache memories; and
   a coherency system bus for communicating information between said plurality of cache memories and said plurality of processor cores in accordance with a coherency protocol, wherein said coherency protocol associates a pending state with said cache line wherein said pending state is one of a plurality of states comprising a pending invalidate write miss state, pending copy back state, and pending copy forward state.

2. A cache coherency system of claim 1 wherein said pending state locks out access to said cache line when said cache line is in transition and continues to lock out access to said cache line until appropriate responses are received indicating continuation of a cache line transaction will not result in race conditions that cause information coherency problems.

3. A cache coherency system of claim 1 wherein said pending invalidate write miss state is a state in which a cache line transaction is waiting for invalidate acknowledgments from other caching agents on said system bus and when said invalidate acknowledgments are received, the pending invalidate write miss state transitions over to a modified state that permits a write operation to proceed.

4. A cache coherency system of claim 1 wherein said pending copy back state is a state in which a cache line transaction is waiting for a copy back reply message and said cache line enters said pending copy back state during a write back due to an external write miss.

5. A cache coherency system of claim 1 wherein said pending copy forward state is a state in which a cache line transaction is waiting for a copy forward reply message and said cache line enters said pending copy forward state during a cache to cache transfer due to an external read miss.

6. A cache coherency system of claim 1 wherein said pending states lock out access to a cache line that is in transition between primary states thereby ensuring coherency and preventing race conditions from developing during the completion of a cache line transaction.

7. A cache coherency system of claim 6 wherein said bus cache coherency protocol further includes three primary cache line states comprising: a modified state in which said cache line includes a recent value;
   a shared state in which said cache line includes the same value as in another memory; and
   an invalid state in which said cache line is not available for access in the particular cache in which it is in the invalid state.

8. A cache coherency system of claim 7 wherein said cache line is in said modify state in one of said plurality of cache and in said invalid state in the rest of said plurality of cache.

9. A cache coherency system of claim 7 wherein said cache line is in said modify state in one of said plurality of caches and in said invalid state in the rest of said plurality of caches.

10. A coherency maintenance system comprising:
    a plurality of cache memories including a cache line for storing information;
    a plurality of processor cues included on a single substrate for processing instructions and information stored In said plurality of cache memories wherein one of said plurality of processor cores is coupled to and associated with one of said plurality of cache memories; and
    a coherency system bus for providing coherency in accordance with a memory coherency maintenance method, wherein said memory coherency maintenance method maintains coherency throughout a shared memory model including said plurality of cache memories wherein said coherency maintenance method associates a pending state with said cache line wherein said pending state is one of a plurality of states comprising a pending invalidate write miss state, pending copy back state, and pending copy forward state.

11. A cache coherency system of claim 10 wherein said memory coherency maintenance method comprises:
    attempting to access information in a first memory;
    entering a pending state;
    changing to a modify state;
    transitioning to an invalid state; and
    shifting to a shared state.

12. A cache coherency system of claim 10 wherein said memory coherency maintenance method comprises a pending state that locks out access to information included in one of said plurality of caches while transitioning between other states.

13. A cache coherency system of claim 10 wherein one of said plurality of processors attempts to access information from an external cache.

14. A cache coherency system of claim 10 wherein a modified state is entered in one of said plurality of cache memories and the information is put into an invalid state in the remaining of said plurality of cache memories.

15. A cache coherency system of claim 10 further comprising in embedded memory for storing information and data for downloading to said plurality of cache memories and utilization by said plurality of processors.

16. A cache coherency system of claim 15 said cache line is in a shared state and comprises the same value as in said embedded main memory.

* * * * *